April 5, 1932.   C. F. SMITH   1,852,984
TRAILER
Filed Feb. 7, 1930   5 Sheets-Sheet 1

C. F. Smith, INVENTOR
BY Victor J. Evans
ATTORNEY

April 5, 1932.  C. F. SMITH  1,852,984
TRAILER
Filed Feb. 7, 1930  5 Sheets-Sheet 2
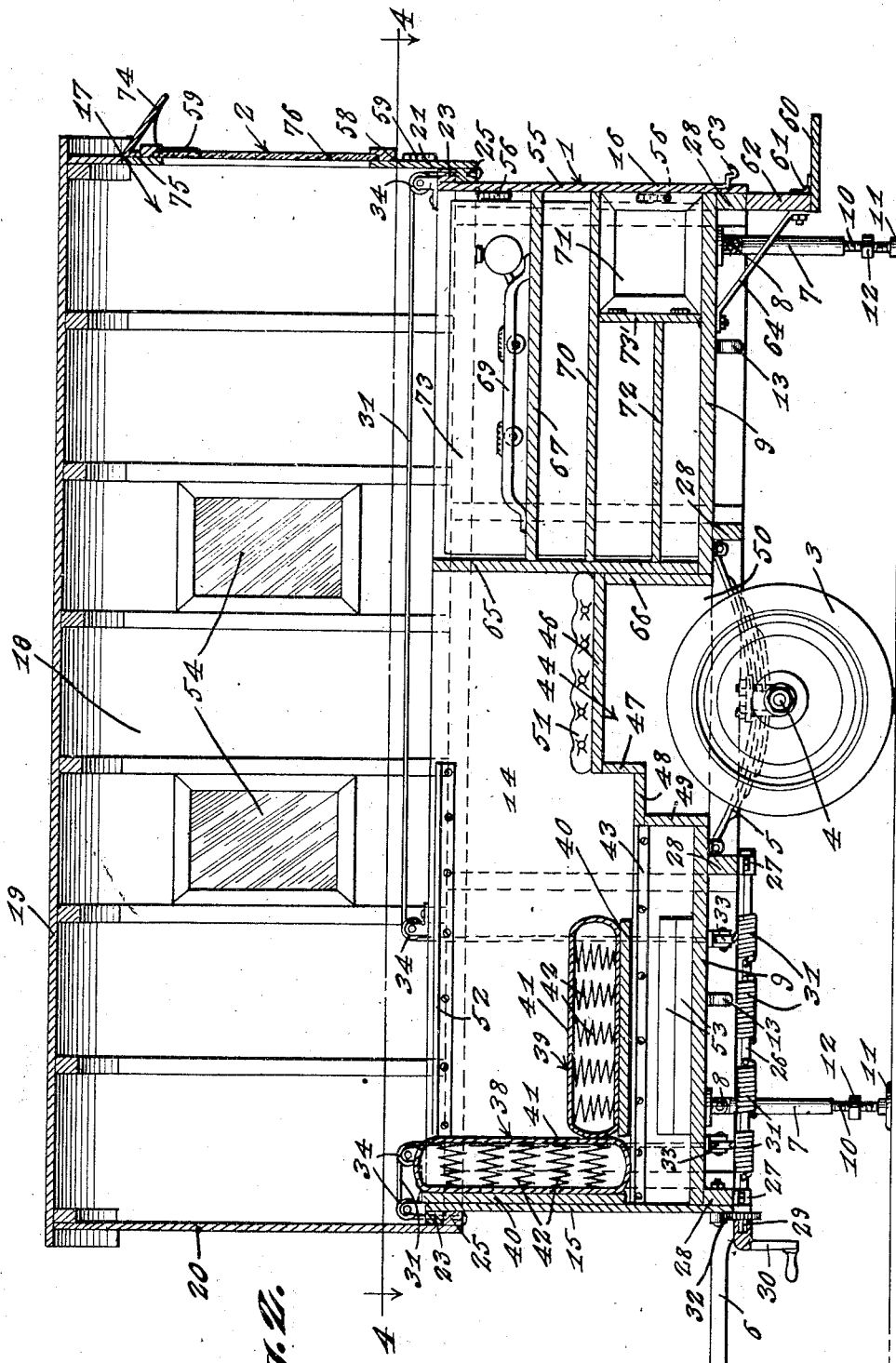
C. F. Smith, INVENTOR
BY Victor J. Evans
ATTORNEY April 5, 1932. C. F. SMITH 1,852,984
TRAILER
Filed Feb. 7, 1930 5 Sheets-Sheet 3
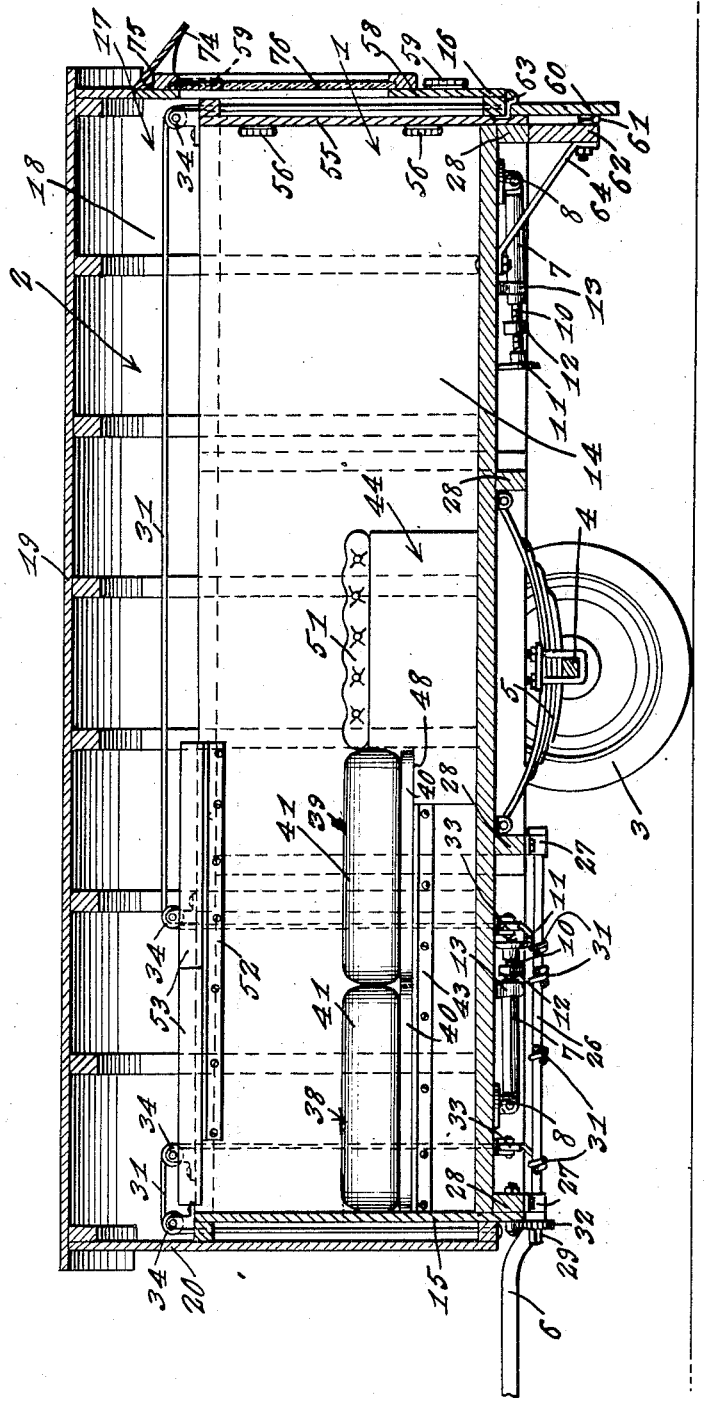

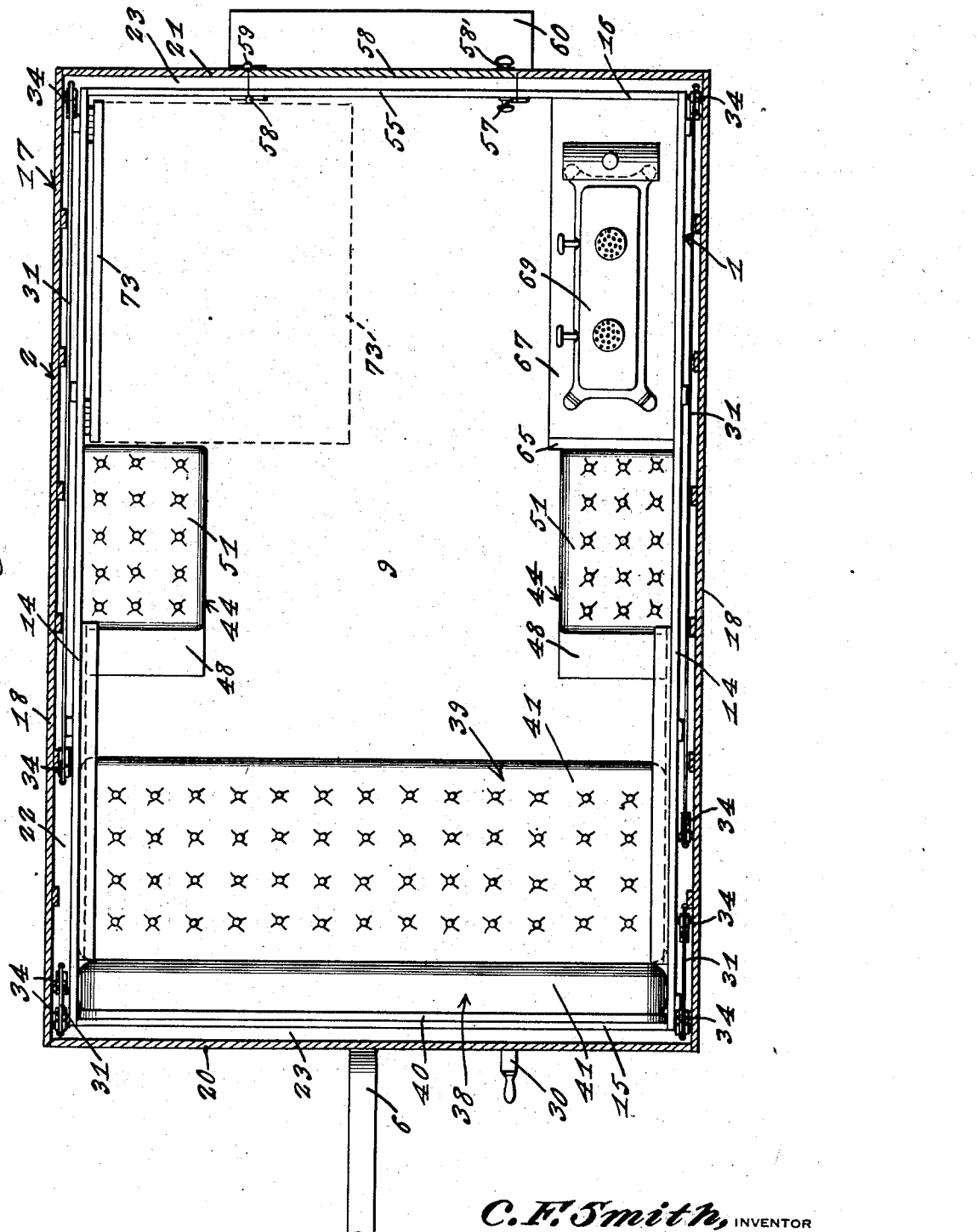

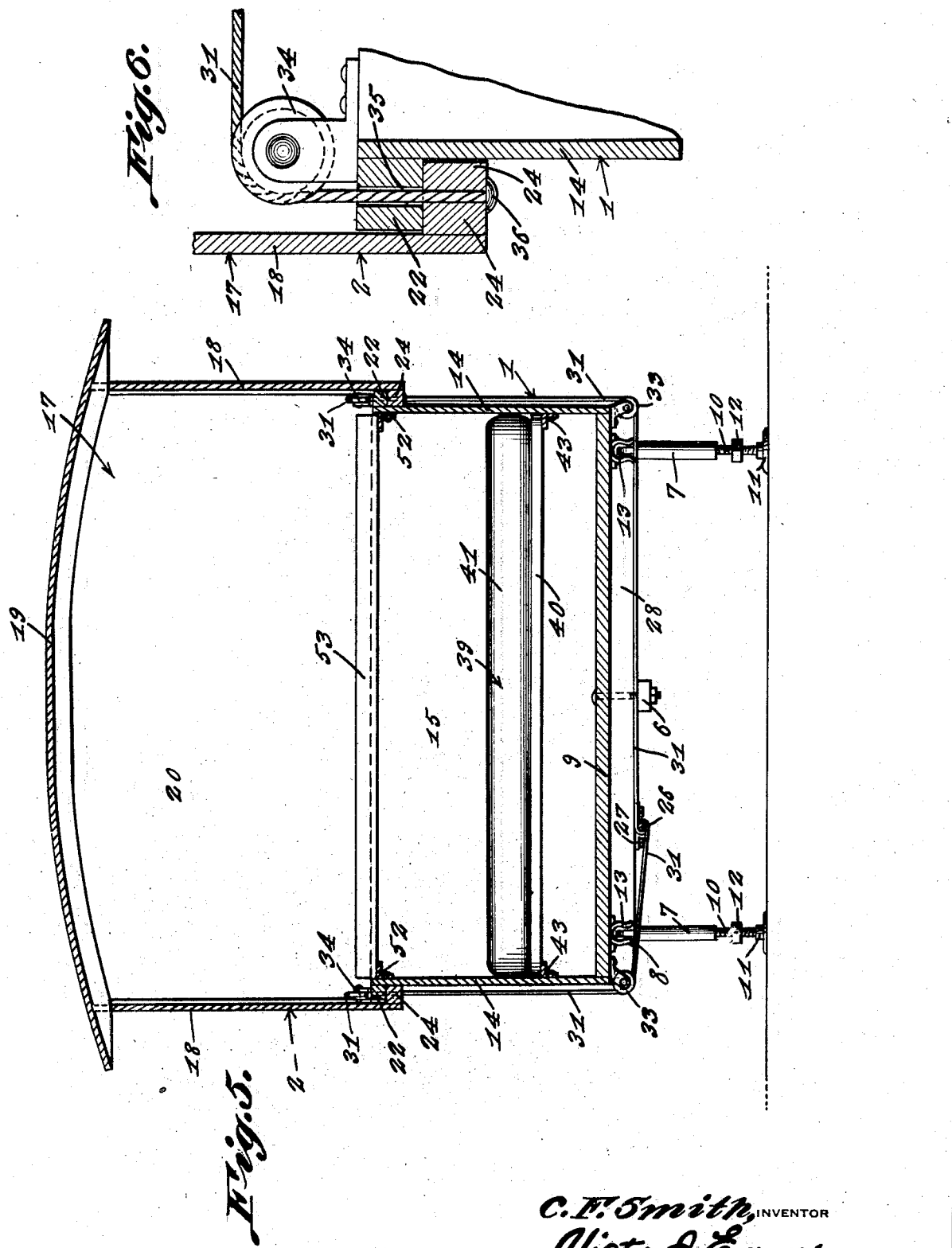

Patented Apr. 5, 1932

1,852,984

UNITED STATES PATENT OFFICE

CLAUDE F. SMITH, OF LONG BEACH, CALIFORNIA

TRAILER

Application filed February 7, 1930. Serial No. 426,644.

This invention relates to trailers for use in connection with automobiles and has as its general object to provide a trailer which may be readily connected with the rear of an ordinary automobile and which will be so constructed that it will serve to accommodate a number of persons on an extended tour, with ample sleeping quarters and dining quarters, so that the device does not present the disadvantage of a tent which requires considerable labor to erect and which is bunglesome, and likewise does not necessitate storage in or upon the body of an automobile of cots, cooking utensils, etc.

Another object of the invention is to provide a trailer in which the bed structure may be readily arranged, to serve during daylight and evening hours as a very comfortable lounge or seat, so that the travelers may rest in comfort in the trailer rather than being crowded and discommoded by having to occupy the automobile seats.

Another object of the invention is to provide a trailer embodying a lower section in which the convertible bed and sofa as well as other seats, a combined kitchen and dining table, a stove, cooking utensils and food may be suitably arranged or stored, and an upper section which may be elevated when the trailer is being employed as sleeping or dining quarters and, which upper portion may be lowered to a position considerably below the rear window of the automobile, during daylight travel, so as to offer no obstruction of the rear view of the driver of the automobile.

Another object of the invention is to provide a trailer which, when in the course of travel and being drawn by the automobile in connection with which it is employed, will be supported upon two ground wheels mounted intermediate the front and rear ends of the trailer so that the trailer will automatically follow the course of travel of the automobile, means being provided for supporting the four corners of the trailer upon the ground surface and being so constructed that the means may be very conveniently brought into use and adjusted, the invention further contemplating such an arrangement of this supporting means as to house the same beneath the lower section of the trailer, during travel, in such a manner that it will not in any way be liable to interfere with the travel of the trailer.

Another object of the invention is to provide a novel arrangement of doors for the upper and lower sections of the trailer, which arrangement is such as to not in any way interfere with the telescopic movement of the upper section to raised and lowered position with respect to the lower section.

A further object of the invention is to provide means whereby an auxiliary sectional bed may be utilized, above the main bed structure, when desired.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Figure 2 is a vertical longitudinal sectional view through the trailer, the combined bed and seat units being arranged for use as seats.

Figure 3 is a similar view illustrating the structure collapsed, by lowering of the upper section thereof, and the combined bed and seat unit arranged for use as a bed.

Figure 4 is a horizontal sectional view on the line 4—4 of Figure 2, looking in the direction indicated by the arrows.

Figure 5 is a vertical transverse sectional view on the line 5—5 of Figure 1 looking in the direction indicated by the arrows.

Figure 6 is a detail sectional view illustrating a portion of the mechanism provided for effecting raising and lowering of the upper section of the trailer.

Figure 1:
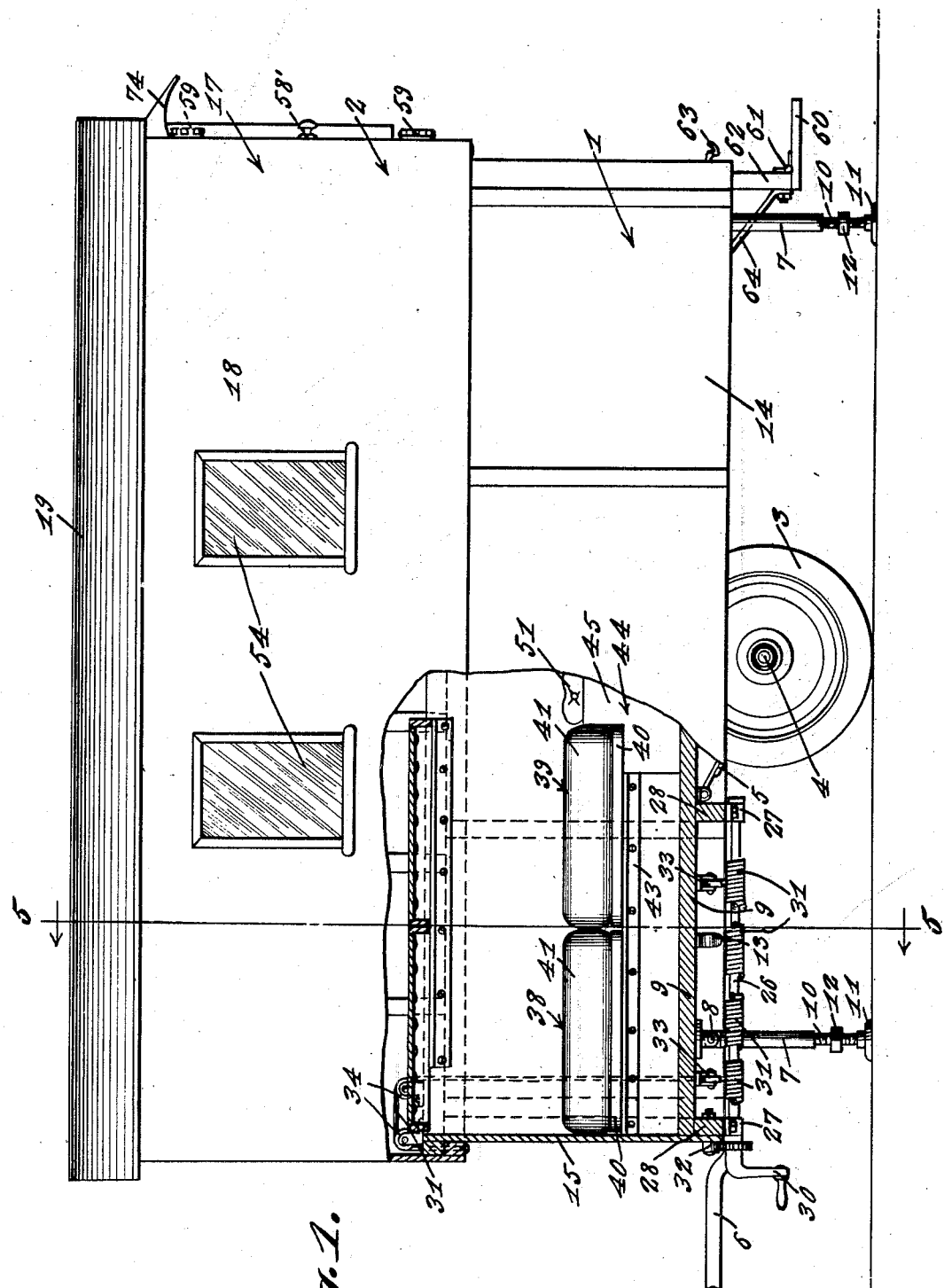
Figure 1 is a view in side elevation of the trailer, embodying the invention, arranged for use, a portion of the adjacent side walls of the upper and lower sections being broken away so as to better illustrate the arrangement of the main and auxiliary bed units of the structure.

The trailer embodying the invention, comprises a lower section which is indicated in general by the numeral 1, and, an upper section indicated by the numeral 2 and the lower section is mounted by means of ground wheels 3 in turn mounted upon the axle 4 supported by a spring 5 and these wheels and their supporting means are located midway between the front and rear ends of the said lower section 1. A draw bar or tongue 6 is mounted at the forward end of the lower section 1 and may be connected, in any desired manner, with the rear axle or other convenient rear part of an automobile by which the trailer is to be drawn.

In order that the trailer may be held stationary, when it is desired to utilize the same for eating and sleeping quarters or for rest quarters, a supporting means is provided at each of the four corners of the section and comprises a tubular member 7 which is pivotally mounted as at 8 upon the under side of the floor 9 of the said section and a threaded stem 10 is swiveled at its lower end in a base 11 which is designed to rest upon the ground surface, when the supporting device is in use, and a squared head 12 is provided upon this stem and is adapted for the application thereto of a wrench whereby the section comprising the supporting means may be extended or contracted. In order that the members may be supported in an elevated position when not in use, spring clips 13 are likewise mounted upon the under side of the floor 9 and in front or rear relation to the pivots 8 so that the supporting members may be swung upwardly beneath the floor 9 of the said section 1 and engaged with the respective clips 13, for the purpose stated. At this point it will be evident that when the structure is not in actual use, the supporting members will be swung to the folded position as stated above, and therefore when the tongue or draw bar 6 is connected with the automobile, the trailer will be caused to exactly follow the path of travel of the automobile, being supported at such time by the wheels 3.

The lower section 1 is of oblong rectangular form and includes, in addition to the floor 9, side walls 14 and a front end wall 15, and a rear wall 16.

The upper section of the trailer is indicated in general by the numeral 17 and it, too, likewise, comprises side walls 18, a top 19, a front end wall 20 and a rear end wall 21, and the upper and lower sections are so proportioned that the upper section may be telescopically fitted over the lower section. In order to limit the upward movement of the upper section, which movement is effected, as well as the lowering movement, by a means to be presently described, rails 22 are secured to the outer sides of the side walls 14 of the lower section and other rails 23 are secured to the outer sides of the front and rear walls of said section and, similarly, rails 24 are secured to the inner sides of the side walls 18 of the upper section 17, and other rails 25 are secured to the inner sides of the front and rear walls of the upper section, it being observed by reference to Figures 1, 2, 5 and 6 of the drawings that, when the upper section is elevated, the corresponding rails of the two sections will be in abutting relation.

The means referred to above, for effecting upward and downward telescopic adjustment of the upper section with respect to the lower section of the trailer comprises a shaft 26 which is mounted in suitable bearings 27 upon the under sides of cross sills 28 mounted near the front and rear of the under side of the floor 9 of the section 1, and the forward end of this shaft is squared as indicated by the numeral 29 and a crank handle 30 is removably fitted thereto and rotatable to effect winding or unwinding of cables 31 which are connected to the shaft 26 at equi-distantly spaced points, suitable ratchet members 32 being provided for preventing unwinding of the cables by the backward rotation of the shaft.

These cables are trained beneath pulleys 33 mounted upon the under side of the floor 9 and are led upwardly at the outer sides of the side walls 14 of the section 1 and over pulleys 34 mounted at the opposite sides of each end of the section 1 at the upper corners thereof, the cables 31 being led downwardly through openings 35 formed in the side rails 22 of the section 1 and, rearwardly, to the pulleys 34 at the rear corners of the said section, the shaft 26 being located at the front of the section 1. It will now be evident that by rotating the shaft 26, through the medium of the crank handle 30, the cables will all be uniformly wound about the shaft, thus causing a vertical elevation of the upper section 17 of the trailer, and causing the same to assume the positions shown in Figures 1, 2, 5 and 6 of the drawings.

The convertible bed and couch unit comprises sections which are indicated in general, one by the numeral 38 and the other by the numeral 39, and these sections are identical in construction and each comprises a base 40 which may be made of wood and a leather cushion 41 which is mounted thereon and within which are arranged cushioning springs 42. Angle iron bars 43 are secured upon the inner sides of the side walls 14 of the section 1 and by reference to Figure 2 of the drawings, it will be observed that when the sections 38 and 39 are to be employed as a couch, the section 38 is moved rearwardly over the angle iron bars 43 and adjusted to assume the upright position shown in this figure, with its base 40 resting against the inner side of the rear wall 15 of the body of the section 1, and the section 39 is then slid along the angle iron bars 43 so that its rear edge or side will engage against the portion of the section 38, which is, at such time, the lower portion, the section 38 then constituting a back rest and the section 39 a seat.

The numeral 44 indicates, in general, guards which are provided for the wheels 3 so as to prevent dust and mud being thrown from the wheels into the interior of the section 1, and these guards are in the nature of housings which may be constructed of wood and are arranged each beside one of the side walls 14 of the section 1, and each includes an inner side wall 45 which is parallel to the said side wall 14 and a top wall 46. A relatively shallow front wall 47 extends downwardly from the forward side of the top wall 46 and a relatively short wall section 48 extends forwardly from the lower edge of the wall section 47, a section 49 extending downwardly from the forward edge of the section 48 and being secured to the floor 9 in any suitable manner at the forward side of an opening 50, which is formed in said floor. A padded cushion 51 is arranged upon the top of each of the guards 44 and therefore the guards serve not only the purpose assigned above, but also as side seats, and by reference to Figures 2 and 3 of the drawings, it will be observed that the upper sides of the cushions 51 are in the same horizontal planes as the upper sides of the cushions 38 and 39, when these cushions 38 and 39 are arranged as shown in Figure 3, so that the cushions 51, at this time, may constitute also extensions of the bed bottom which is formed by the said sections 38 and 39. It will be observed, at this point that when the sections 38 and 39 are arranged in the manner shown in Figure 2 there is a space left in front of the said section 39 and the wall portions 47 and 49 of the guards 44, so that there is ample room for the ones occupying the seat 39, to rest in comfort and, as the guards 44 are relatively narrow, the cushions 51 may be occupied with equal comfort.

As the sections 38 and 39 extend the entire width of the interior of the trailer, the bed which they form, when arranged in the manner shown in Figure 3, is sufficiently wide to comfortably accommodate two persons, and in order that more than this number may be accommodated, angle iron bars 52 are secured to the inner sides of the side walls 14 of the section 1 near the front of said section and near the upper edges thereof, and consequently a considerable distance above the angle iron bars 43, and said bottom sections 53 are of any desired construction so long as they will afford comfort to those reclining thereon, and may be removably mounted at their opposite ends upon the said angle bars 52 as shown in Figure 1 and may be occupied by others who are making the trip or journey. When these bed bottom sections are not in use, they may be stored beneath the cushion section 39 in the manner clearly shown in Figure 2 of the drawings.

Windows, indicated by the numeral 54 are preferably mounted in the sides of the upper section 18 so that light may enter the trailer when the upper section 17 is in elevated position, and the trailer is in actual use. In order that access may be gained to the interior of the trailer, the lower section 1 is provided with a doorway at its rear end, and a door 55 is mounted, by hinges 56, in this doorway and is adapted to be swung inwardly and is held closed by an ordinary door latch or lock 57. In a similar manner the upper section 17 is formed with a door opening in its rear end and a door 58 is mounted by hinges 59 at one side of this doorway and is adapted to be swung outwardly to open position and is normally held closed by a door latch or lock 58', and at this point it will be evident, that, as illustrated in Figure 4, the doors 55 and 58 are so mounted that they may be both swung to open position so as to provide for access to the interior of the structure.

A step member 60 is hinged as at 61 to a cross piece 62 which is mounted upon the under side of the rear cross piece 28 of the floor structure, and the step is so hingedly connected with the said cross piece 62 that when it is lowered to the full line position shown in Figure 2, this portion, in advance of its hinges 61, will engage upon the under side of the cross piece 28 so that the step will be securely supported in horizontal position, and in order that the step may be supported in an elevated position, a spring clip 63 is mounted upon the rear wall of the lower section 1 and is engageable with the free edge of the step 60 when the step is swung to raised position as for example, during travel of the trailer over the road surface. A brace 64 is secured at its upper end to the under side of the floor 9 and is inclined downwardly and rearwardly and secured at its lower end to the rear side of the cross piece 62.

In order that meals may be cooked and served in the trailer, the proper facilities are provided, as will now be described. The numeral 65 indicates a board which is mounted at its lower end upon the floor 9 at the rear side of one of the openings 50 of the floor, and with its lower portion extending upwardly beside the rear wall of the respective guard 44, which rear wall is indicated by the numeral 66. This board extends upwardly to substantially the same height as the side, front, and rear walls of the section 1, and a shelf 67 is mounted between this wall and the rear wall 16 of the said section 1, and a stove 69 in the form of a gasoline stove is mounted upon this shelf. Below the shelf 67 and arranged in a similar manner there is another shelf 70 which likewise extends between the wall 65 and the rear wall 16 of the section 1, and the rear end of this wall extends over the top of the casing of a refrigerator or ice box 71.

A third shelf 72 is arranged below the shaft 70 and extends between the wall 65 and a shorter wall 73' which is mounted upon the bottom 9 of the unit 1 and against the forward wall of the ice box 71 and dishes, cooking utensils, knives, forks, and other kitchen utensils as well as dining table utensils may be arranged upon these shelves.

A dining table is provided in that rear corner of the structure opposite the corner in which the stove, refrigerator and shelves are mounted, and this table comprises a top 73 which is hingedly mounted at one of its longitudinal edges upon the respective side wall 14 of the section 1 at a point sufficiently elevated with respect to the cushion 51 at the corresponding side of the section, to permit one seated upon this cushion to conveniently use the table top in consuming a meal, any suitable means being provided, of course, for holding the table top in its lowered or downwardly swung position.

In order that rain may be prevented from entering the doorway in the rear end of the upper section of the trailer, a hood 74 is mounted as at 75 upon the rear wall 21 of the said upper section above said doorway and preferably this door will be provided with a pane 76 so that the occupants may view the highway.

What I claim is:—

A trailer comprising a closure structure, wheels supporting the structure, seats located in the structure at each side thereof and intermediate the ends of said structure, offset portions formed on the seats and located in a plane below said seats, supporting elements secured to the sides of the structure and extending from one end wall thereof to the offset portions, and a pair of cushions slidably and adjustably mounted on said supporting elements and when in one position one of said cushions disposed vertically against the aforementioned end wall with the other cushion disposed horizontally to provide a combined lounge and seat spaced from the first named seats and when placed in another position both cushions disposed horizontally with one cushion abutting the first named seats to provide spaced beds located at each side of the structure.

In testimony whereof I affix my signature.

CLAUDE F. SMITH.